April 30, 1957  E. B. GRAVES  2,790,907
SIMPLIFIED PHOTO TIMING
Filed Dec. 28, 1953
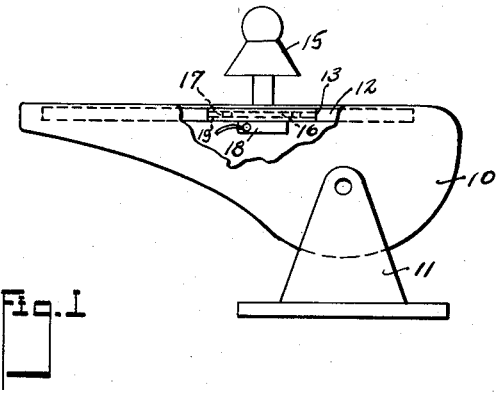
Fig.1
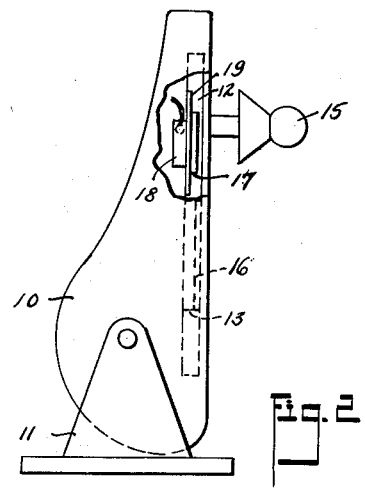
Fig.2
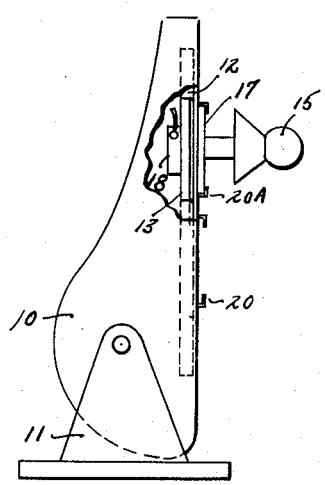
Fig.4
Fig.3
INVENTOR.
Edward B. Graves
BY Bates, Teare & McLean
Attorneys

United States Patent Office 2,790,907
Patented Apr. 30, 1957

2,790,907

SIMPLIFIED PHOTO TIMING

Edward B. Graves, South Euclid, Ohio, assignor to Picker X-Ray Corporation, Waite Mfg. Div. Inc., Cleveland, Ohio, a corporation of Ohio Application December 28, 1953, Serial No. 400,727

2 Claims. (Cl. 250—57)

This invention relates to simplification and improvement in the photo-timing of radiographic exposures in X-ray apparatus, and more particularly relates to an arrangement whereby a single photo timer may be moved into various positions along a supporting table relative to the subject of the X-ray radiograph.

The usual X-ray apparatus includes features permitting both fluoroscopic and radiographic exposure of a subject and, with respect to the latter feature, includes provision for guiding a film carried in a cassette into different positions relative to the subject being X-rayed as well as means in the form of a radiation sensitive element for controlling and timing the film exposure. Thus, in a radiographic examination, the X-ray radiation is directed toward the subject, and the radiographic film and radiation sensitive element are operatively interposed in the directed path of the radiation. The usual apparatus also includes a Bucky grid which under certain circumstances of examination is interposed between the subject and the sensitized radiographic film to screen out secondary radiation.

Use of the foregoing operative elements, in radiographic examinations is conventional and may, require a plurality of photo-timer receivers operably disposed at various stations in relation to the examination positions of the subject so that when the film is moved into the various examining positions, the exposure will be effectively controlled by the photo-timer. The cost of plural photo-timers and the necessary wiring and switching unduly complicates the apparatus and tends to restrict the freedom of examination.

Accordingly, it is a principal object of this invention to reduce the number of photo-timer receivers and thereby eliminate the attendant complications and restrictions by arranging the apparatus to accommodate a single movable photo-timer.

It is a further object of this invention to provide an X-ray apparatus with a single photo-timer capable of being positioned to conform with the position of the subject under examination and thereby provide a more economical and less complicated type of apparatus.

Briefly, in accordance with this invention, there is provided an X-ray table capable of being positioned in either a horizontal or vertical position, depending upon the nature of the X-ray examination, and carrying a guide for supporting a Bucky grid in different positions corresponding to the desired position of subject exposure. The Bucky grid is carried in a housing which is supported for movement along the guide parallel to the table supporting surface, and the apparatus includes provision for supporting a film cassette in operative position adjacent any selected position of the subject. A single photo-timer unit is operatively supported for movement along the guide for alignment with the directed radiation corresponding to the position of the subject relative to the support. In one embodiment, the photo-timer unit may be positioned along the guide as a unit with the cassette and in another embodiment may be positioned independently of the cassette and as a unit with the Bucky housing.

In the drawings:

Fig. 1 illustrates a tiltable X-ray table with a portion cut away through the side wall to illustrate the disposition of the Bucky housing and photo timer;

Fig. 2 illustrates the tiltable table of Fig. 1 in a vertical position and shows, through a cut-away portion of the table, the photo-timer and cassette displaced above the Bucky housing for alignment with the directed Z-ray beam;

Figs. 3 and 4 illustrate the horizontal and vertical positions of the tiltable table with table portions cut away to show the photo timer respectively positioned at different locations as a unit with the Bucky frame.

Referring now to Figs. 1 and 2 of the drawings, there is shown a tiltable X-ray table 10 adapted to support a patient or the like thereon and capable of tilting movement about a supporting base 11 from a horizontal to a vertical position as shown in Fig. 2 of the drawings. The frame of the table 10 includes a guide in the form of a track 12 or the like which normally guides a Bucky housing 13 beneath the supporting surface of the table and parallel to its length for alignment with the directed beam of a movable X-ray tube head 15 for different examining positions of a subject.

In the embodiment illustrated in Figs. 1 and 2 of the drawings, the Bucky grid 16 is shown by dotted lines as operatively supported within a Bucky housing 13 which may take the form of a frame carriage or the like adapted for movement along the guide track 12 parallel to the table surface. In this embodiment the Bucky housing 13 is open ended to permit the insertion and removal of the film cassette 17 and a photo-timer 18. The film cassette and photo-timer are preferably assembled as a unit above and below a common supporting tray 19, which may be guided along the track 12 in a manner similar to the Bucky housing. Thus, when the table 10 is in the horizontal position of Fig. 1 and adapted for the type of radiographic examination which requires the interposition of the Bucky grid, the tray 19 along with the cassette 17 and photo-timer 18 is positioned within the Bucky housing 13 in alignment with the directed X-ray beam. On the other hand, when the table 10 is tilted to the vertical position illustrated in Fig. 2 of the drawings, and the tube head 15 is positioned for examination of a subject that does not require the interposition of the Bucky grid, but, nevertheless, requires the exposure control provided by the photo-timer 18, the tray 19 along with the cassette 17 and photo-timer are positioned as shown in the full line position through the cut-a-way portion in the table side. If the nature of the subject is such that it is desired to screen out secondary radiations by interposing the Bucky grid 16 into the path of the beam shown in Fig. 2, the unitary tray assembly of cassette and photo-timer may remain within the Bucky housing 13 and the entire assembly positioned vertically along the guide track 12 for alignment with the directed beam. It will be understood that suitable stops may be provided to hold the tray 19 or the housing 13 in any of the selected positions.

An alternative form of embodiment is shown in Figs. 3 and 4 of the drawings, wherein the photo-timer 18 is secured to the Bucky housing 13 and moves as a unit therewith, into different positions along the supporting surface. With this arrangement, the cassette 17 may be positioned independently of the unitary arrangement of the Bucky housing and the photo-timer by locating suitable slide brackets 20 on the table supporting surface. The brackets 20 are in the form of parallel guides which may be incorporated into the table structure and a plurality of such guide brackets may be arranged in different selected positions along the table 10. There are two sets 20 and 20A of such guide brackets shown in the drawings, one of which receives the cassette 17 when the table 10 is in the horizontal position of Fig. 3 and the Bucky housing 13 along with the attached photo-timer 18 is positioned beneath the cassette and aligned with the directed X-ray beam. Similarly, when the table 10 is positioned vertically and it is desired to move the cassette to the upper guide brackets 20A for exposure to a subject in that location, the Bucky housing 13 and attached photo-timer 18 may then be positioned along the guide track 12 to a position beneath the cassette as shown in the cut-away portion of Fig. 4 of the drawings. When utilizing the alternative embodiment illustrated in Figs. 3 and 4, wherein both the Bucky housing 13 and attached photo-timer 18 are positioned as a unit in operative proximity to the film cassette 17, the photo-timer can be suitably calibrated to be proportionately sensitive to the different nature of the subject and examination.

By providing an arrangement whereby a single photo-timer may be positioned at will adjacent different operative positions of the film cassette and the Bucky grid in relation to the subject of the examination and the directed beam of X-rays, there is enabled a reduction in cost as well as a less complicated and restricted type of X-ray apparatus, without sacrificing any of the operative advantages normally obtainable with plurality of photo-timers as heretofore practiced.

I have shown and described what I consider to be the preferred embodiments of my invention along with suggested modified or alternative forms, and it will be obvious to those skilled in the art that other changes and modifications, may be made without departing from the scope of my invention as defined by the appended claims.

I claim:

1. In combination with an X-ray table having a longitudinal guide disposed along its supporting surface and parallel to the direction of movement of a movable beam of X-rays, a frame carriage movably supported on said guide and having side members defining an open end facing the direction of movement, a Bucky grid supported in said carriage, a tray movably supported on said guide for selective positioning into and out of the carriage, and a film holder and photo-timer, each independently carried by said tray and adapted to be positioned thereby independently of the grid for alignment with a subject and the X-ray beams relative to the table supporting surface.

2. In an X-ray table having a subject supporting surface and including a source of X-rays directed at the supporting surface and movable to selected longitudinal positions along said surface the combination comprising, a longitudinal guide carried by the table and disposed parallel to the supporting surface in the direction of movement of said X-ray beam, a housing including a Bucky grid carried by the guide and adapted to intercept the directed X-ray beam in at least one position of the source, a film holder adapted to be independently supported adjacent the table supporting surface, a photo-timer for controlling film exposure, a tray mounted for free movement along the guide and adapted to independently support the photo-timer and film holder for alignment respectively with any selected position of the source of X-rays.

References Cited in the file of this patent
UNITED STATES PATENTS

| | | |
|---|---|---|
| 1,978,745 | Franke | Oct. 30, 1934 |
| 2,488,315 | Morgan et al. | Nov. 15, 1949 |
| 2,617,943 | Marks et al. | Nov. 11, 1952 |
| 2,668,913 | Goldfield et al. | Feb. 9, 1954 |